United States Patent
Ishiguro

(10) Patent No.: US 11,531,848 B2
(45) Date of Patent: Dec. 20, 2022

(54) DATA PROCESSING APPARATUS, DATA PROCESSING METHOD AND SEMICONDUCTOR MANUFACTURING APPARATUS

(71) Applicant: Hitachi High-Tech Corporation, Tokyo (JP)

(72) Inventor: Masaki Ishiguro, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 234 days.

(21) Appl. No.: 16/959,093

(22) PCT Filed: Jul. 26, 2019

(86) PCT No.: PCT/JP2019/029408
§ 371 (c)(1),
(2) Date: Jun. 29, 2020

(87) PCT Pub. No.: WO2020/115943
PCT Pub. Date: Jun. 11, 2020

(65) Prior Publication Data
US 2021/0027108 A1    Jan. 28, 2021

(51) Int. Cl.
*G06F 119/18*        (2020.01)
*G06K 9/62*          (2022.01)
(Continued)

(52) U.S. Cl.
CPC .......... *G06K 9/6262* (2013.01); *G06F 7/24* (2013.01); *G06F 30/27* (2020.01); *G06K 9/623* (2013.01); *G06N 20/00* (2019.01); *G06F 2119/18* (2020.01)

(58) Field of Classification Search
USPC .......................................................... 702/182
See application file for complete search history.

(56) References Cited

U.S. PATENT DOCUMENTS

2020/0067969 A1* 2/2020 Abbaszadeh ........ G06K 9/6269

FOREIGN PATENT DOCUMENTS

JP    H7253966 A     10/1995
JP    2009-10370 A    1/2009

OTHER PUBLICATIONS

P. Pudil, J. Novovicova, and J. Kittier, "Floating search methods in feature selection." Pattern Recognition Letters, vol. 15, pp. 1119-1125, Nov. 1994.
(Continued)

*Primary Examiner* — Bryce M Aisaka
(74) *Attorney, Agent, or Firm* — Miles & Stockbridge, P.C.

(57) ABSTRACT

A data processing apparatus in which a trade-off between over-learning prevention and calculation load prevention is eliminated when creating a model formula is provided. The data processing apparatus includes: a recording unit that records electronic data; and a computing unit that performs computing using the electronic data, in which the computing unit includes a feature amount selection unit used for computing, and the feature amount selection unit performs feature amount selection including: a first step (S101) of ranking feature amounts and rearranging the feature amounts from top; a second step (S103) of creating a plurality of data groups using only a part of the feature amounts according to the order; a third step (S104) of calculating a value that is an index for evaluating prediction performance of a regression or classification problem using each of the data groups using only a part of the feature amounts; a fourth step (S105) of deleting feature amounts based on the calculated prediction performance index; and a fifth step (S106) of updating the order of the feature amounts, which are feature amounts other than the deleted feature amount, using the prediction performance index, in
(Continued)

which the second step to the fifth steps are iterated (S102) until an optimal value of the prediction performance index calculated in the third step is no longer updated.

10 Claims, 4 Drawing Sheets

(51) Int. Cl.
  *G06N 20/00* (2019.01)
  *G06F 30/27* (2020.01)
  *G06F 7/24* (2006.01)

(56) References Cited

OTHER PUBLICATIONS

Sa Wang, Cheng-Lin Liu, and Lian Zheng, "Feature selection by combining fisher criterion and principal feature analysis," in Proc. of the Sixth International Conference on Machine Learning and Cybernetics, Hong Kong, China, 2007, pp. 1149-1154.

Leo Breiman, "Random Forest," Machine Learning, vol. 45, pp. 5-32, 2001.

Ayano Tatematsu et al. "Influence of network latency and jitter in haptic media, sound and video transmission" Journal of the Institute of Image Information and Television Engineers, Dec. 2010, vol. 64, No. 12, pp. 1873-1883.

Koichi Fujiwara et al. "An efficient input variable selection for a linear regression model by NC spectral clustering" IEICE Technical Report, Oct. 2012, vol. 112, No. 279, pp. 359-366.

Written Opinion dated Oct. 15, 2019 in corresponding International Application No. PCT/JP2019/029408.

Search Report dated Oct. 15, 2019 in corresponding International Application No. PCT/JP2019/029408.

* cited by examiner

[FIG. 1]
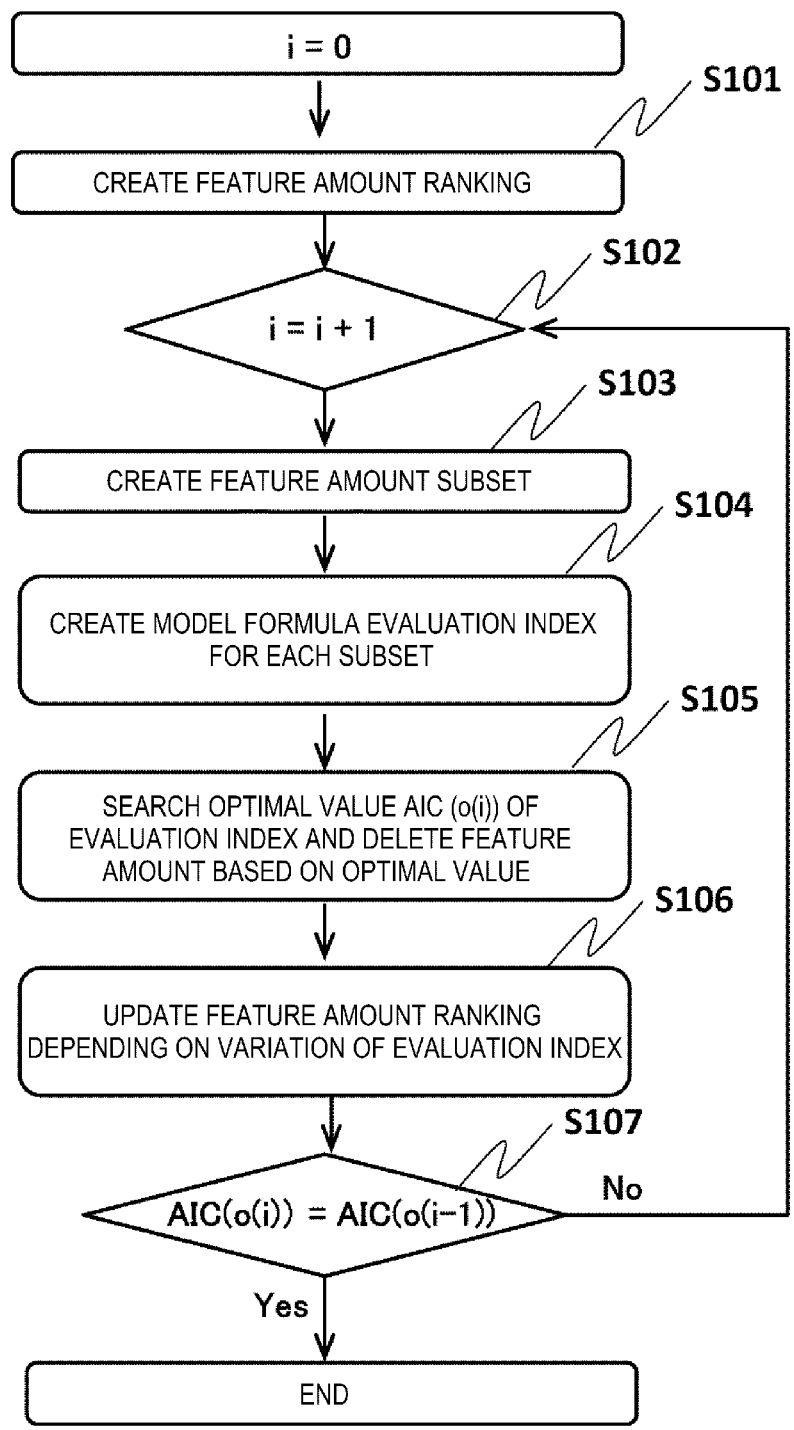

[FIG. 2]
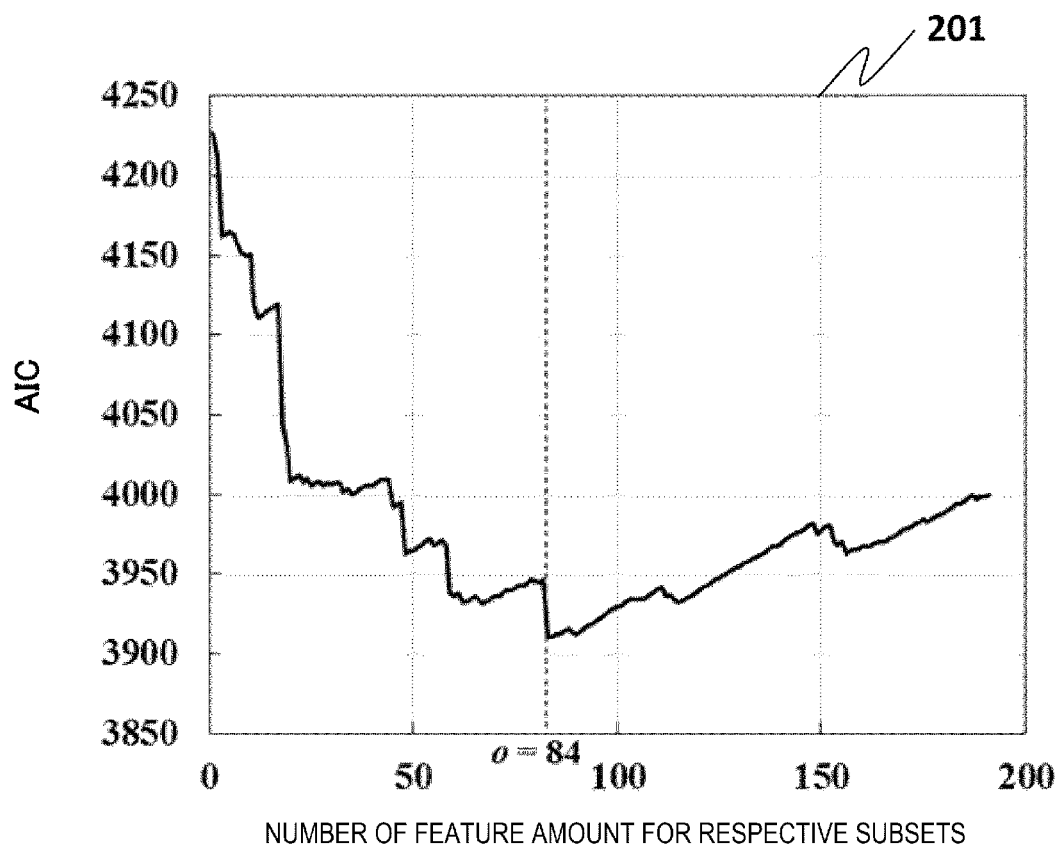
NUMBER OF FEATURE AMOUNT FOR RESPECTIVE SUBSETS

[FIG. 3]
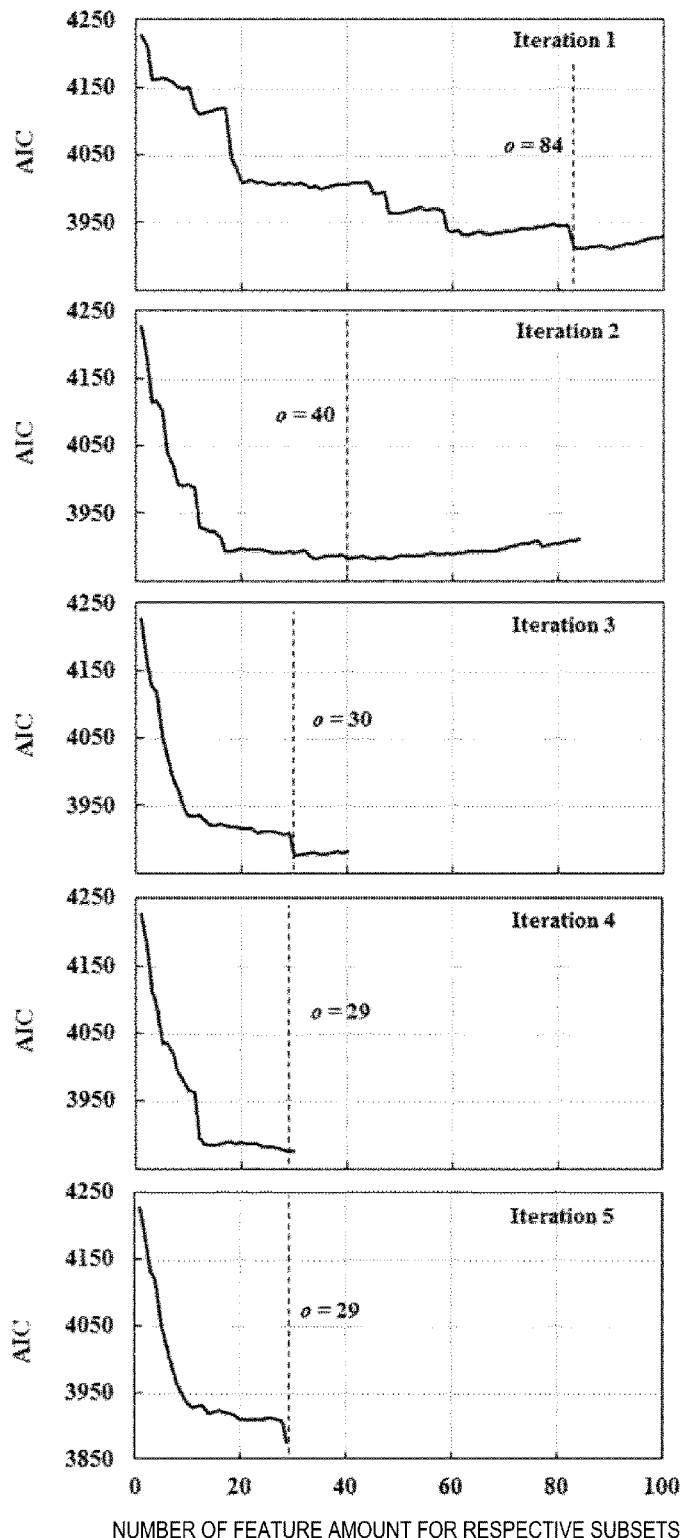
NUMBER OF FEATURE AMOUNT FOR RESPECTIVE SUBSETS

| METHOD NAME | | NUMBER OF SELECTED FEATURE AMOUNT | PREDICTION ERROR INDEX OBTAINED BY CROSS-VALIDATION METHOD | REQUIRED TIME [s] |
|---|---|---|---|---|
| WRAPPER METHOD | Sequential Forward Selection | 60 | 6 | 2800 |
| | Genetic Algorithm | 65 | 2.00E+06 | 2700 |
| | Particle Swarm Optimization | 64 | 2.80E+06 | 1800 |
| FILTER METHOD | Fisher Criterion | 98 | 7.50E+06 | 43 |
| | RReliefF | 97 | 2.00E+05 | 47 |
| EMBEDDED METHOD | LASSO | 39 | 6.1 | 1200 |
| | SVM-RFE | 109 | 7.70E+04 | 1700 |
| | Rondom Forest | 58 | 2.00E+06 | 44 |

| METHOD NAME FOR DETERMINING INITIAL RANKING | | NUMBER OF SELECTED FEATURE AMOUNT | PREDICTION ERROR INDEX OBTAINED BY CROSS-VALIDATION METHOD | REQUIRED TIME [s] |
|---|---|---|---|---|
| FILTER METHOD | Fisher Criterion | 13 | 6.3 | 60 |
| | RReliefF | 10 | 6.4 | 55 |
| EMBEDDED METHOD | SVM-RFE | 19 | 6.2 | 131 |
| | Rondom Forest | 30 | 6.5 | 64 |

DATA PROCESSING APPARATUS, DATA PROCESSING METHOD AND SEMICONDUCTOR MANUFACTURING APPARATUS

TECHNICAL FIELD

The present invention relates to a data processing apparatus, a data processing method, and a semiconductor manufacturing apparatus, and more particularly to a technique for predicting a processing result by data analysis.

BACKGROUND ART

In recent manufacturing industry, efforts to effectively utilize data obtained from a manufacturing apparatus and to improve productivity are attracting attention. For example, in a semiconductor manufacturing apparatus, prediction of a processing result using a method such as a multiple regression analysis as disclosed in PTL 1 is widely used for process control and the like. On the other hand, in the modern manufacturing industry where a manufacturing process is becoming more sophisticated and complicated, the amount of data obtained in an entire production plant is enormous, and selection of significant data and non-significant data becomes an indispensable problem in operating the manufacturing apparatus utilizing the data. For example, in the semiconductor manufacturing apparatus, it is not uncommon that one manufacturing apparatus is provided with more than several tens of sensors for acquiring the data. When the time required for the manufacturing process is long, more data is accumulated, and the amount of the data to be handled is enormous.

In normal data processing, a time-series signal obtained from measurement performed by a sensor is not used as it is, and a feature amount that well represents a feature of the signal or a value referred to as a feature is often used. An average value, a standard deviation value, or the like of the time-series signal is one of the feature amounts. By extracting the feature amount from the time-series signal, the amount of the data can be compressed to a certain extent, but at a stage of extracting the feature amount, it is desirable to extract as many feature amounts as possible. However, in many cases, many extracted feature amounts are meaningless in the analysis, and such meaningless feature amounts not only increase a calculation time, but also may adversely affect an analysis result as noise in the analysis. Furthermore, in creation of a model formula for predicting a processing result or the like, as the feature amount to be used increases, a possibility of falling into a state of lacking generalization performance referred to as over-learning when creating the model formula increases.

Akaike information criteria (AIC) is well known as an evaluation index of validity of the model formula for preventing the over-learning, and selection of significant variables using the AIC is disclosed in, for example, PTL 2. In addition, many algorithms have been proposed for selecting the feature amount that is likely to be analytically significant from the extracted feature amounts.

For example, NPL 1 discloses a feature amount selection method using iteration calculation referred to as sequential forward selection. This method is one of the feature amount selection methods and referred to as a wrapper method. NPL 2 discloses a method of creating a ranking of significance of feature amounts referred to as Fisher criterion and selecting the feature amount according to the ranking. This method is one of the feature amount selection methods and referred to as a filter method. NPL 3 discloses a method of creating a ranking of significance of feature amounts in a regression method referred to as random forest and selecting the feature amount according to the ranking. This method is one of the feature amount selection methods and referred to as an embedded method.

CITATION LIST

Patent Literature

PTL 1: JP-A-2009-10370
PTL 2: JP-A-7-253966

Non-Patent Literature

NPL 1: P. Pudil, J. Novovicova, and J. Kittler, "Floating search methods in feature selection," Pattern Recognition Letters, vol. 15, pp. 1119-1125, November 1994.
NPL 2: Sa Wang, Cheng-Lin Liu, and Lian Zheng, "Feature selection by combining fisher criterion and principal feature analysis," in Proc. of the Sixth International Conference on Machine Learning and Cybernetics, Hong Kong, China, 2007, pp. 1149-1154.
NPL 3: Leo Breiman, "Random Forest," Machine Learning, vol. 45, pp. 5-32, 2001.

SUMMARY OF INVENTION

Technical Problem

The above-described wrapper method requires an evaluation index for optimization when performing the iteration calculation, and the filter method and the embedded method require an evaluation index for optimizing the number of feature amounts. As mentioned above, the AIC may be used for this evaluation index. However, the AIC is effective as an index for securing the generalization performance of the model and preventing the over-learning, but there are cases where the over-learning occurs even when optimization is performed by evaluation using the AIC. Also in such a case, there is a cross-validation method as a method of effectively preventing the over-learning, but the cross-validation method requires a great deal of time for calculation.

An object of the invention is to provide a data processing apparatus, a data processing method, and a semiconductor manufacturing apparatus capable of solving the above-described problems and eliminating a trade-off between over-learning prevention and calculation load prevention when creating a model formula.

Solution to Problem

In order to achieve the above object, the invention provides a data processing apparatus that obtains a prediction model using a feature amount, which includes a computing device configured to execute: a first step of rearranging ranked N first feature amounts in an order from first to N-th, provided that N is a natural number; a second step of creating N first data groups; a third step of obtaining a first evaluation index value for evaluating prediction performance of each of the first data groups; a fourth step of deleting a part of the first feature amounts based on the first evaluation index values; a fifth step of updating an order of second feature amounts, which are feature amounts other than the feature amounts deleted in the first feature amounts, using the first evaluation index values; a sixth step of creating second data groups whose number is the same as the number of the second feature amounts; a seventh step of obtaining a second evaluation index value for evaluating prediction performance of each of the second data groups; and an eighth step of obtaining a prediction model using the second feature amounts when a minimum value of the first evaluation index values is the same as a minimum value of the second evaluation index values, or deleting a part of the second feature amounts based on the second evaluation index values, and updating an order of third feature amounts, which are feature amounts other than the feature amounts deleted in the second feature amounts, using the second evaluation index values when the minimum value of the first evaluation index values is different from the minimum value of the second evaluation index values, in which an N-th first data group has the first to N-th feature amounts of the first feature amounts, and an M-th second data group has the first to M-th feature amounts of the second feature amounts, provided that M is the number of the second feature amounts.

Further, in order to achieve the above object, the invention provides a semiconductor manufacturing apparatus in which a processing result is predicted by a prediction model obtained using a feature amount, which includes a control device configured to execute: a first step of rearranging ranked N first feature amounts in an order from first to N-th, provided that N is a natural number; a second step of creating N first data groups; a third step of obtaining a first evaluation index value for evaluating prediction performance of each of the first data groups; a fourth step of deleting a part of the first feature amounts based on the first evaluation index values; a fifth step of updating an order of second feature amounts, which are feature amounts other than the feature amounts deleted in the first feature amounts, using the first evaluation index values; a sixth step of creating second data groups whose number is the same as the number of the second feature amounts; a seventh step of obtaining a second evaluation index value for evaluating prediction performance of each of the second data groups; and an eighth step of obtaining a prediction model using the second feature amounts when a minimum value of the first evaluation index values is the same as a minimum value of the second evaluation index values, or deleting a part of second feature amounts based on the second evaluation index values, and updating an order of third feature amounts, which are feature amounts other than the feature amounts deleted in the second feature amounts, using the second evaluation index values when the minimum value of the first evaluation index values is different from the minimum value of the second evaluation index values, in which an N-th first data group has the first to N-th feature amounts of the first feature amounts, and an M-th second data group has the first to M-th feature amounts of the second feature amounts, provided that M is the number of the second feature amounts.

Further, in order to achieve the above object, a data processing method that obtains a prediction model using a feature amount is provided. The method includes: a first step of rearranging ranked N first feature amounts in an order from first to N-th, provided that N is a natural number; a second step of creating N first data groups; a third step of obtaining a first evaluation index value for evaluating prediction performance of each of the first data groups; a fourth step of deleting a part of the first feature amounts based on the first evaluation index values; a fifth step of updating an order of second feature amounts, which are feature amounts other than the feature amounts deleted in the first feature amounts, using the first evaluation index values; a sixth step of creating second data groups whose number is the same as the number of the second feature amounts; a seventh step of obtaining a second evaluation index value for evaluating prediction performance of each of the second data groups; and an eighth step of obtaining a prediction model using the second feature amounts when a minimum value of the first evaluation index values is the same as a minimum value of the second evaluation index values, or deleting a part of second feature amounts based on the second evaluation index values, and updating an order of third feature amounts, which are feature amounts other than the feature amounts deleted in the second feature amounts, using the second evaluation index values when the minimum value of the first evaluation index values is different from the minimum value of the second evaluation index values, in which an N-th first data group has the first to N-th feature amounts of the first feature amounts, and an M-th second data group has the first to M-th feature amounts of the second feature amounts, provided that M is the number of the second feature amounts.

Advantageous Effect

According to the data processing apparatus of the invention, the trade-off between the over-learning prevention and the calculation load prevention when creating the model formula is eliminated.

BRIEF DESCRIPTION OF DRAWINGS

FIG. 1 is a diagram showing a flowchart of a data processing operation in a feature amount selection unit according to a first embodiment.

FIG. 2 is a graph showing a relationship between AIC and the number of feature amounts in feature amount selection performed by a method of the related art according to the first embodiment.

FIG. 3 shows graphs showing how the relationship between the AIC and the number of feature amounts changes in an iteration step during the feature amount selection performed by the feature amount selection unit according to the first embodiment.

FIG. 4 is a diagram showing a table summarizing the number of the feature amounts, RR prediction performance, and the time required for calculation in the method of the related art according to the first embodiment.

FIG. 5 is a diagram showing a table summarizing the number of the feature amounts, RR prediction performance, and calculation time when the feature amount selection is performed by the feature amount selection unit according to the first embodiment.

DESCRIPTION OF EMBODIMENTS

Hereinafter, embodiments of the invention will be described in order with reference to the drawings. In the present description, N and M which are natural numbers may be expressed as n and m which are alphanumeric lowercase characters.

First Embodiment

The first embodiment is an embodiment of a data processing apparatus in which a trade-off between over-learning prevention and calculation load prevention when creating a model formula is eliminated. That is, the first embodiment is an embodiment of a data processing apparatus, a data processing method, and a semiconductor manufacturing apparatus. The first embodiment discloses a data processing apparatus that obtains a prediction model using a feature amount, which includes a computing device configured to execute: a first step of rearranging ranked N first feature amounts in an order from first to N-th, provided that N is a natural number; a second step of creating N first data groups; a third step of obtaining a first evaluation index value for evaluating prediction performance of each of the first data groups; a fourth step of deleting a part of the first feature amounts based on the first evaluation index values; a fifth step of updating an order of second feature amounts, which are feature amounts other than the feature amounts deleted in the first feature amounts, using the first evaluation index values; a sixth step of creating second data groups whose number is the same as the number of the second feature amounts; a seventh step of obtaining a second evaluation index value for evaluating prediction performance of each of the second data groups; and an eighth step of obtaining a prediction model using the second feature amounts when a minimum value of the first evaluation index values is the same as a minimum value of the second evaluation index values, or deleting a part of the second feature amounts based on the second evaluation index values, and updating an order of third feature amounts, which are feature amounts other than the feature amounts deleted in the second feature amounts, using the second evaluation index values when the minimum value of the first evaluation index values is different from the minimum value of the second evaluation index values, in which an N-th first data group has the first to N-th feature amounts of the first feature amounts, and the M-th second data group has the first to M-th feature amounts of the second feature amounts, provided that M is the number of the second feature amounts.

The data processing apparatus and the processing apparatus method according to the first embodiment will be described with reference to FIGS. 1 to 5. The data processing apparatus of the present embodiment includes, although not shown, a recording unit that records electronic data and a computing unit that computes the recorded electronic data. Since such a data processing apparatus can be implemented by a general computer that is represented by a personal computer (PC) and includes a central processing unit (CPU) for computing the electronic data, a storage unit for storing the electronic data and various processing programs, an input/output unit including a keyboard and a display, and a communication interface, the data processing apparatus is not shown.

In the computing unit of the data processing apparatus according to the present embodiment, a feature amount selection unit that can be implemented by a processing program is provided. There are two types of electronic data recorded in the recording unit: electronic data serving as an explanatory variable of the model formula and electronic data serving as an objective variable. For example, in a case of data processing for processing result prediction in a manufacturing apparatus, the electronic data serving as the explanatory variable is data related to an operating state of the manufacturing apparatus, and the data serving as the objective variable is data of a processing result.

In the present embodiment, more specifically, a chemical mechanical polishing (CMP) apparatus, which is one of the semiconductor manufacturing apparatuses, will be described as the manufacturing apparatus. Here, the data serving as the explanatory variable is a monitor value of a processing condition during the processing, such as a rotation speed of a wafer and a slurry amount, and data related to a state of the apparatus itself, such as a time of using a polishing pad. On the other hand, the data serving as the objective variable is a polishing amount (removal rate: RR) of the wafer by processing in the CMP apparatus. A model formula to be created is a regression formula for predicting the RR based on the above apparatus data.

The apparatus data recorded in the recording unit is computed by the computing unit, and is subjected to pre-analysis processing such as elimination of apparently abnormal data and extraction of the feature amounts. When the number of samples of the apparatus data increases, rows of a matrix with the feature amount on a horizontal axis and the samples on a vertical axis increases. The matrix in which the feature amounts of the respective samples are arranged as described above is referred to as a feature amount matrix. In this feature amount matrix, when a desired condition for shifting to analysis is satisfied, data of the feature amount matrix and RR value data corresponding to each sample of the feature amount matrix are sent to the feature amount selection unit. Here, the condition for shifting to analysis include that the number of the samples in the feature amount matrix exceeds a desired value, and an accumulation period of the samples in the feature amount matrix exceeds a desired period.

Using the feature amount matrix and the RR data sent to the feature amount selection unit, feature amount selection processing is performed according to a flowchart shown in FIG. 1. As described above, execution of the selection processing is performed by executing a predetermined program of the CPU.

In the flowchart of FIG. 1, in the first step in the feature amount selection unit, firstly, significance of the feature amount, that is, a feature amount ranking is created by using Fisher criterion which is one of filter methods (S101).

In the second step in the feature amount selection unit, a data group using only a part of feature amounts is created according to a ranking (i) created in the first step. Hereinafter, this data group is referred to as a subset.

In the second step, subsets having the same number as the number of the feature amounts are created (S103). Here, the feature amounts included in an N-th subset are the feature amounts from the first to the N-th in the ranking. For example, when a total number of the feature amount is three, a first subset includes only a feature amount in the first ranking. A second subset includes two feature amounts in the first and second rankings. A third subset includes three feature amounts in the first, second and third rankings.

In the third step in the feature amount selection unit, for all the subsets created in the second step, an evaluation index, which is a value serving as an index for evaluating prediction performance in a regression or classification problem, that is, a model formula evaluation index, is calculated and created (S104). The present embodiment involves a regression problem of estimating the RR, and the above-described AIC is adopted as an index for evaluating the prediction performance. The third step is to calculate the respective AIC for all subsets.

FIG. 2 shows an example of a graph in which numbers of the respective subsets are plotted on a horizontal axis and the corresponding AICs are plotted on a vertical axis. In the fourth step of the present embodiment, unnecessary feature amounts are determined and deleted based on the AIC calculated in the third step (S105). In the graph 201 of FIG. 2, the AIC has a smallest AIC at a No. 84 subset. This indicates that feature amounts whose ranking is from the first to the 84th contribute to improving the prediction performance, but the 85th and subsequent feature amounts do not contribute to improving the prediction performance. Therefore, in the fourth step, the feature amount corresponding to a ranking of the subset number following the subset number with the smallest AIC is deleted. That is, in the present embodiment, the feature amounts in the 85th and higher rankings are deleted.

In the fifth step of the feature amount selection unit of the present embodiment, the ranking is updated, based on the AIC, for the feature amounts remained in the fourth step (S106). A new ranking is determined depending on a significance gap (SG) shown in Equation 1 below (S107).

[Math 1]

$$SG(n) = AIC(n) - AIC(n-1) \quad \text{(Equation 1)}$$

Here, AIC(n) is a value of the AIC for an n-th subset. Since an SG(1) cannot be calculated, a value smaller than any SG(n) is set.

A meaning of the SG in the fifth step is described below. The n-th subset is obtained by adding a feature amount whose ranking is n-th to an (n−1)th subset. Therefore, the SG(n) indicates a degree of improvement in the prediction performance due to an addition of the n-th feature amount to the (n−1)th subset. Therefore, as this value becomes smaller, the improvement in the prediction performance increases due to the n-th feature amount, and it is determined that the n-th feature amount is significant. In the fifth step, a significance ranking of the feature amount is updated in an ascending order of the SG.

After the fifth step is ended, in the present embodiment, the second to fifth steps are iterated (S102). FIG. 3 shows graphs of AIC values in respective subsets obtained in the third step of respective iterations by iteration. It can be seen that the feature amounts selected by the iteration decrease, and a minimum value of the AIC also decreases, that is, the prediction performance improves.

The iteration from the second step to the fifth step is performed until a minimum value of an AIC obtained in the third step in an m-th iteration is equal to a minimum value of an AIC obtained in the third step in an (m−1)th iteration. After the iteration is ended, a subset having a lowest AIC becomes a subset including the selected feature amount.

Using the subset including the selected feature amount in the above procedure, the computing unit creates a regression model for estimating the RR. Information on the regression model and the subset including the feature amount is stored in the recording unit. As described above, a step of acquiring both the apparatus data and the RR data for creating a model for a desired period or a desired amount and selecting the feature amount to create the model is generally referred to as a training step.

On the other hand, an operation step of acquiring only the apparatus data and predicting the RR based on the data is referred to as a testing step. In the testing step, data newly stored in the recording unit is sent to the computing unit, and the pre-analysis processing such as the extraction of the feature amounts similar to that in the training step is performed. After that, a feature amount whose item is the same as an optimal subset including a feature amount stored in the storage unit is selected, and the RR is estimated by using the regression model for estimating the RR stored in the recording unit.

In order to confirm an effect of the over-learning prevention, an effect of calculation time reduction, and RR prediction performance according to the present embodiment, a verification analysis is performed using data in which the RR is already known. The above verification is performed by using a cross-validation method.

FIG. 4 is a table 401 showing existing feature amount selection methods, the number of selected feature amounts when being used for the feature amount selection in regression problems, a prediction error index serving as an RR prediction performance index, and a time required for the feature amount selection. At this time, the AIC is used as a performance evaluation index for feature amount selection in a wrapper method. The AIC is also used as an index for determining an optimal number of the feature amounts in a filter method and the wrapper method. For final prediction performance, a mean squared error (MSE) obtained by the cross-validation method is used.

As shown in FIG. 4, in sequential forward selection of the wrapper method and LASSO of an embedded method, the MSE indicating the prediction performance is a good value, but a long calculation time in the order of 1000 seconds is required. As for the other methods, the value of the MSE is extremely bad, which indicates that over-learning occurs.

FIG. 5 is a table 501 showing the number of selected feature amounts when the feature amount selection methods in the feature amount selection unit of the present embodiment is used for feature amount selection in a similar regression problem, the prediction error index serving as the RR prediction performance index, and the time required for the feature amount selection. As shown in the table 501, it is confirmed that over-learning is prevented in a time as short as the filter method and a part of the embedded methods as methods of the related art, and performance almost equivalent to that obtained by the sequential forward selection and the LASSO as the methods of the related art is obtained.

Therefore, it can be said that the data processing apparatus of the present embodiment eliminates the trade-off between the over-learning prevention and the calculation load prevention when creating the model formula.

An estimated value of the processing result obtained by the model formula obtained by the invention can be widely used. For example, there may be a system that issues a warning when a difference between the estimated value of the processing result obtained by the model formula and acquired data and a desired processing value is larger than a certain management value. In addition, there may be a control system that controls processing of the manufacturing apparatus in response to the warning. The above-mentioned control may be control for stopping a manufacturing process performed by the manufacturing apparatus. Further, the control may be control for automatically changing processing conditions of the manufacturing apparatus.

The invention is described in detail based on the first embodiment, but the invention is not limited to the first embodiment, and various modifications can be made without departing from the scope of the invention. For example, in the first embodiment, the CMP apparatus is described as an example, but other data may be used regardless of data from the CMP apparatus. Above all, since the semiconductor manufacturing apparatus has a large number of commonly used sensors and operation methods are often complicated, in view of a fact that the extracted feature amount is large and a fact that data of the processing result serving as the objective variable is difficult to obtain in real time, other data is suitable for an application destination of the invention. For example, data from a plasma etching apparatus is suitable for data to be processed in the invention.

For example, such a semiconductor manufacturing apparatus that performs predetermined processing on an object to be processed includes: a sensor that monitors a state of the semiconductor manufacturing apparatus; a recording unit that records electronic data of the state of the semiconductor manufacturing apparatus based on an output of the sensor; and a computing unit that performs computing using the electronic data related to the state of the semiconductor manufacturing apparatus. The computing unit includes a feature amount selection unit used for computing, and the feature amount selection unit performs feature amount selection including: a first step of ranking feature amounts and rearranging the feature amounts from top; a second step of creating a plurality of data groups using only a part of the feature amounts according to the order; a third step of calculating a value that is an index for evaluating prediction performance of a regression or classification problem using each of the data groups using only a part of the feature amounts; a fourth step of deleting feature amounts based on the calculated prediction performance index; and a fifth step of updating the order of the feature amounts, which are feature amounts other than the deleted feature amounts, using the prediction performance index, in which the second step to the fifth step are iterated until an optimal value of the prediction performance index calculated in the third step is no longer updated.

That is, a semiconductor manufacturing apparatus in which a processing result is predicted by a prediction model obtained using a feature amount includes a control device configured to execute: a first step of rearranging ranked N first feature amounts in an order from first to N-th, provided that N is a natural number; a second step of creating N first data groups; a third step of obtaining a first evaluation index value for evaluating prediction performance of each of the first data groups; a fourth step of deleting a part of the first feature amounts based on the first evaluation index values; a fifth step of updating an order of second feature amounts, which are feature amounts other than the feature amounts deleted in the first feature amounts, using the first evaluation index values; a sixth step of creating second data groups whose number is the same as the number of the second feature amounts; a seventh step of obtaining a second evaluation index value for evaluating prediction performance of each of the second data groups; and an eighth step of obtaining a prediction model using the second feature amounts when a minimum value of the first evaluation index values is the same as a minimum value of the second evaluation index values, or deleting a part of second feature amounts based on the second evaluation index values, and updating an order of third feature amounts, which are feature amounts other than the feature amounts deleted in the second feature amounts, using the second evaluation index values, when the minimum value of the first evaluation index values is different from the minimum value of the second evaluation index values, in which an N-th first data group has the first to N-th feature amounts of the first feature amounts, and the M-th second data group has the first to M-th feature amounts of the second feature amounts, provided that M is the number of the second feature amounts.

Note that each of the recording unit and the computing unit in the training processing, and the recording unit and the computing unit in the testing processing according to the invention may exist in a single piece of hardware, or may be distributed and arranged in a plurality of pieces of hardware.

Further, the number of the manufacturing apparatus serving as a data source of the invention may be one or plural. One created model formula may be applied to data processing of a plurality of manufacturing apparatuses, or a plurality of model formulas may be created and applied to data processing of different manufacturing apparatuses.

Further, the feature amount selection unit in the computing unit may be independent as hardware. Further, the unit may exist as a part of a program in hardware of the entire computing unit, and does not have to be independent as the hardware.

Further, in the first embodiment, the ranking is created by the existing filter method in the first step, but the ranking may be created by a method other than the existing filter method.

Furthermore, in the first embodiment, in the third step, the AIC is adopted as an index for evaluating the prediction performance, but this index may be an index other than the AIC.

REFERENCE SIGN LIST

201: graph
401, 501: table

The invention claimed is:

1. A data processing apparatus that obtains a prediction model using a feature amount, the data processing apparatus comprising:
   a computing device configured to execute
   a first step of rearranging ranked N first feature amounts in an order from first to N-th, provided that N is a natural number,
   a second step of creating N first data groups,
   a third step of obtaining a first evaluation index value for evaluating prediction performance of each of the first data groups,
   a fourth step of deleting a part of the first feature amounts based on the first evaluation index values,
   a fifth step of updating an order of second feature amounts, which are feature amounts other than the feature amounts deleted from the first feature amounts, using the first evaluation index values,
   a sixth step of creating second data groups whose number is the same as the number of the second feature amounts,
   a seventh step of obtaining a second evaluation index value for evaluating prediction performance of each of the second data groups, and
   an eighth step of obtaining a prediction model using the second feature amounts when a minimum value of the first evaluation index values is the same as a minimum value of the second evaluation index values, or deleting a part of the second feature amounts based on the second evaluation index values, and updating an order of third feature amounts, which are feature amounts other than the feature amounts deleted from the second feature amounts using the second evaluation index values when the minimum value of the first evaluation index values is different from the minimum value of the second evaluation index values, wherein
   an N-th first data group has the first to N-th feature amounts of the first feature amounts, and
   an M-th second data group has the first to M-th feature amounts of the second feature amounts, provided that M is the number of the second feature amounts.

2. The data processing apparatus according to claim 1, wherein
   the first evaluation index value is a value obtained using Akaike Information Criteria (AIC).

3. The data processing apparatus according to claim 1, wherein
in the fifth step, the order of the second feature amounts is updated using a value obtained by subtracting the first evaluation index value corresponding to an (N−1)th first data group from the first evaluation index value corresponding to the N-th first data group.

4. A semiconductor manufacturing apparatus in which a processing result is predicted by a prediction model obtained using a feature amount, the semiconductor manufacturing apparatus comprising:
a control device configured to execute
a first step of rearranging ranked N first feature amounts in an order from first to N-th, provided that N is a natural number,
a second step of creating N first data groups, a third step of obtaining a first evaluation index value for evaluating prediction performance of each of the first data groups,
a fourth step of deleting a part of the first feature amounts based on the first evaluation index values,
a fifth step of updating an order of second feature amounts, which are feature amounts other than the feature amounts deleted from the first feature amounts, using the first evaluation index values,
a sixth step of creating second data groups whose number is the same as the number of the second feature amounts,
a seventh step of obtaining a second evaluation index value for evaluating prediction performance of each of the second data groups, and
an eighth step of obtaining a prediction model using the second feature amounts when a minimum value of the first evaluation index values is the same as a minimum value of the second evaluation index values, or deleting a part of the second feature amounts based on the second evaluation index values, and updating an order of third feature amounts, which are feature amounts other than the feature amounts deleted from the second feature amounts, using the second evaluation index values when the minimum value of the first evaluation index values is different from the minimum value of the second evaluation index values, wherein
an N-th first data group has the first to N-th feature amounts of the first feature amounts, and
an M-th second data group has the first to M-th feature amounts of the second feature amounts, provided that M is the number of the second feature amounts.

5. The semiconductor manufacturing apparatus according to claim 4, wherein
the first evaluation index value is a value obtained using Akaike Information Criteria (AIC).

6. The semiconductor manufacturing apparatus according to claim 4, wherein
in the fifth step, the order of the second feature amounts is updated using a value obtained by subtracting the first evaluation index value corresponding to an (N−1)th first data group from the first evaluation index value corresponding to the N-th first data group.

7. The semiconductor manufacturing apparatus according to claim 4, wherein
the prediction model predicts a plasma processing result of a plasma processing apparatus.

8. A data processing method that obtains a prediction model using a feature amount, the data processing method comprising:
a first step of rearranging ranked N first feature amounts in an order from first to N-th, provided that N is a natural number;
a second step of creating N first data groups;
a third step of obtaining a first evaluation index value for evaluating prediction performance of each of the first data groups;
a fourth step of deleting a part of the first feature amounts based on the first evaluation index values;
a fifth step of updating an order of second feature amounts, which are feature amounts other than the feature amounts deleted from the first feature amounts, using the first evaluation index values;
a sixth step of creating second data groups whose number is the same as the number of the second feature amounts;
a seventh step of obtaining a second evaluation index value for evaluating prediction performance of each of the second data groups; and
an eighth step of obtaining a prediction model using the second feature amounts when a minimum value of the first evaluation index values is the same as a minimum value of the second evaluation index values, or deleting a part of the second feature amounts based on the second evaluation index values, and updating an order of third feature amounts, which are feature amounts other than the feature amounts deleted from the second feature amounts, using the second evaluation index values when the minimum value of the first evaluation index values is different from the minimum value of the second evaluation index values, wherein
an N-th first data group has the first to N-th feature amounts of the first feature amounts, and
an M-th second data group has the first to M-th feature amounts of the second feature amounts, provided that M is the number of the second feature amounts.

9. The data processing method according to claim 8, wherein
the first evaluation index value is a value obtained using Akaike Information Criteria (AIC).

10. The data processing method according to claim 8, wherein
in the fifth step, the order of the second feature amounts is updated using a value obtained by subtracting the first evaluation index value corresponding to an (N−1)th first data group from the first evaluation index value corresponding to the N-th first data group.

* * * * *